United States Patent
Nagai et al.

(10) Patent No.: US 9,567,032 B2
(45) Date of Patent: Feb. 14, 2017

(54) BRAKE CALIPER ARRANGEMENT STRUCTURE FOR MOTORCYCLE

(71) Applicant: HONDA MOTOR CO., LTD., Tokyo (JP)

(72) Inventors: Ryuichi Nagai, Wako (JP); Hirokatsu Nakaie, Niiza (JP); Hidetoshi Toyoda, Tokorozawa (JP); Shinji Ito, Tokorozawa (JP); Shinji Kawasaki, Niiza (JP); Yasumasa Matsui, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/433,806

(22) PCT Filed: Jul. 22, 2013

(86) PCT No.: PCT/JP2013/069788
§ 371 (c)(1),
(2) Date: Apr. 6, 2015

(87) PCT Pub. No.: WO2014/069051
PCT Pub. Date: May 8, 2014

(65) Prior Publication Data
US 2015/0291250 A1    Oct. 15, 2015

(30) Foreign Application Priority Data

Nov. 1, 2012   (JP) .................................. 2012-241923

(51) Int. Cl.
*F16D 55/00*        (2006.01)
*B62L 1/00*         (2006.01)
(Continued)

(52) U.S. Cl.
CPC ................ *B62L 1/005* (2013.01); *B62K 19/38* (2013.01); *B62K 25/20* (2013.01); *B62K 25/28* (2013.01); *B62L 1/00* (2013.01); *F16D 65/0068* (2013.01)

(58) Field of Classification Search
CPC .. F16D 65/00; F16D 65/0056; F16D 65/0068; F16D 65/0075; F16D 65/02; F16D 2066/003; F16D 2055/0008; F16D 2055/0016; F16D 2055/002; B62L 1/00; B62L 1/005; B62K 25/20; B62K 19/38; B62K 25/28

See application file for complete search history.

(56) References Cited

U.S. PATENT DOCUMENTS

| 5,249,650 A | 10/1993 | Tanaka |
| 2002/0033296 A1 | 3/2002 | Ohyama et al. |

(Continued)

FOREIGN PATENT DOCUMENTS

| CN | 1096986 A | 1/1995 |
| CN | 1605539 A | 4/2005 |

(Continued)

OTHER PUBLICATIONS

International Search Report, Date of mailing: Oct. 1, 2013.
(Continued)

*Primary Examiner* — Pamela Rodriguez
(74) *Attorney, Agent, or Firm* — Rankin, Hill & Clark LLP

(57) ABSTRACT

A brake caliper arrangement structure for a saddled vehicle, wherein a brake caliper for braking and a brake caliper for parking are provided on a swing arm. At least one or other of the brake caliper for braking and the brake caliper for parking is arranged in front of a rear axle being the axle of the rear wheel, when viewed from a side, at a position on a vehicle widthwise inside of the swing arm and overlapping the swing arm.

8 Claims, 6 Drawing Sheets

(51) Int. Cl.
*B62K 25/20* (2006.01)
*B62K 19/38* (2006.01)
*F16D 65/00* (2006.01)
*B62K 25/28* (2006.01)

(56) References Cited

U.S. PATENT DOCUMENTS

2009/0000883 A1  1/2009  Bagnoli
2009/0243377 A1  10/2009  Kofuji et al.

FOREIGN PATENT DOCUMENTS

| | | |
|---|---|---|
| CN | 1205082 C | 6/2005 |
| JP | 60-125421 | 7/1985 |
| JP | 63-1830 | 1/1988 |
| JP | 1-174295 | 12/1989 |
| JP | 4-208687 | 7/1992 |
| JP | 2003-312579 | 11/2003 |
| JP | 2004-537021 | 12/2004 |
| JP | 2009-280205 | 12/2009 |
| WO | 03/014588 | 2/2003 |

OTHER PUBLICATIONS

Japanese Notice of Allowance issued Jan. 5, 2016 with English Translation, 6 pages.
Chinese Office Action with English Translation dated Aug. 25, 2016, 14 pages.
European Search Report dated May 27, 2016.

BRAKE CALIPER ARRANGEMENT STRUCTURE FOR MOTORCYCLE

TECHNICAL FIELD

The present invention relates to a brake caliper arrangement structure for a saddled vehicle.

Priority is claimed on Japanese Patent Application No. 2012-241923, filed Nov. 1, 2012, the contents of which are incorporated herein by reference.

BACKGROUND ART

As disclosed in Patent Document 1, there is known a motorcycle which comprises two brake calipers, one for braking and one for parking. In this motorcycle, the brake caliper for braking and the brake caliper for parking are provided on a swing arm.

DOCUMENT OF RELATED ART

Patent Document

[Patent Document 1] Japanese Unexamined Patent Application, First Publication No. 2009-280205

SUMMARY OF INVENTION

Problems to be Solved by the Invention

When providing a brake caliper on a vehicle, because the bank angle needs to be ensured, the arrangement is subject to restrictions. When providing multiple brake calipers as in the related art, the arrangement is even more restricted.

Aspects of the present invention have an object of providing a brake caliper arrangement structure for a saddled vehicle, in which the bank angle can be easily ensured even when two brake calipers are provided.

Means for Solving the Problem

As a means for solving the above problem, the present invention employs the following aspects (1) A brake caliper arrangement structure of an aspect of the present invention is a brake caliper arrangement structure for a saddled vehicle comprising: a swing arm that rotatably supports a rear wheel; a brake caliper for braking; and a brake caliper for parking which can maintain a parked state; wherein the brake caliper for braking and the brake caliper for parking are provided on the swing arm. At least one or other of the brake caliper for braking and the brake caliper for parking is arranged in front of an axle of the rear wheel when viewed from a side, at a position on a vehicle widthwise inside of the swing arm and overlapping the swing arm.

(2) In the aspect of (1) above, one or other of the brake caliper for braking and the brake caliper for parking may be arranged in front of the axle of the rear wheel when viewed from the side, at a position on the vehicle widthwise inside of the swing arm and overlapping the swing arm, the other being arranged above the swing arm.

(3) In the aspect of (2) above, the brake caliper for parking may be arranged in front of the axle of the rear wheel when viewed from the side, at a position on the vehicle widthwise inside of the swing arm and overlapping the swing arm, and a brake cable connected to the brake caliper for parking may extend upward.

(4) In the aspect of any one of (1) through (3) above, a single bracket may be provided on the swing arm, and the brake caliper for braking and the brake caliper for parking may be attached to the bracket.

(5) In the aspect of (4) above, the brake caliper for parking may have a left and right split construction composed of a left half portion and a right half portion, wherein the left half portion and the right half portion are jointly fastened to the bracket by a fastening member so as to support the bracket.

(6) In the aspect of either one of (4) and (5) above, the bracket may comprise two support portions corresponding to the swing arm, one of the support portions being configured as a boss portion which supports and has the axle inserted therethrough, and the other being configured as a recess portion which engages with a protrusion portion formed on the swing arm so as to allow relative movement in a direction of extension of the swing arm. One of the brake caliper for braking and the brake caliper for parking may be arranged in front of the axle of the rear wheel when viewed from the side, at a position on the vehicle widthwise inside of the swing arm and overlapping the swing arm, the other may be arranged above the swing arm, and the recess portion may be positioned between the brake caliper for braking and the brake caliper for parking.

Advantageous Effects of Invention

According to the aspect of (1) above, by arranging at least one of the brake caliper for braking and the brake caliper for parking so as to utilize the space on the vehicle widthwise inside of the swing arm without affecting the bank angle, projection to the vehicle widthwise outside resulting from the placement of the brake caliper can be suppressed. Thereby, the bank angle can be ensured easily even when two brake calipers are provided. Moreover the outward appearance can also be improved.

According to the aspect of (2) above, the height from the ground of the brake caliper for braking or the brake caliper for parking that is positioned above the swing arm, can be ensured, as can the bank angle.

According to the aspect of (3) above, the brake cable can be more easily routed than in a case where the brake cable extends downward, and the degree of freedom in the arrangement of the brake caliper for parking can be improved.

According to the aspects of (4) and (5) above, the number of components can be reduced.

According to the aspect of (6) above, because the bracket can be mounted to the swing arm in a way that restricts swinging with respect to the swing arm, using a simple construction that effectively utilizes the space between the two brake calipers, the size of the bracket can be reduced.

DESCRIPTION OF THE EMBODIMENTS

Hereunder, embodiments of the present invention are described, with reference to the figures. In the figures used in the following description, arrow FR denotes the vehicle front side, arrow UP denotes the vehicle upper side, and arrow LH denotes the vehicle left side.

Figure 1:
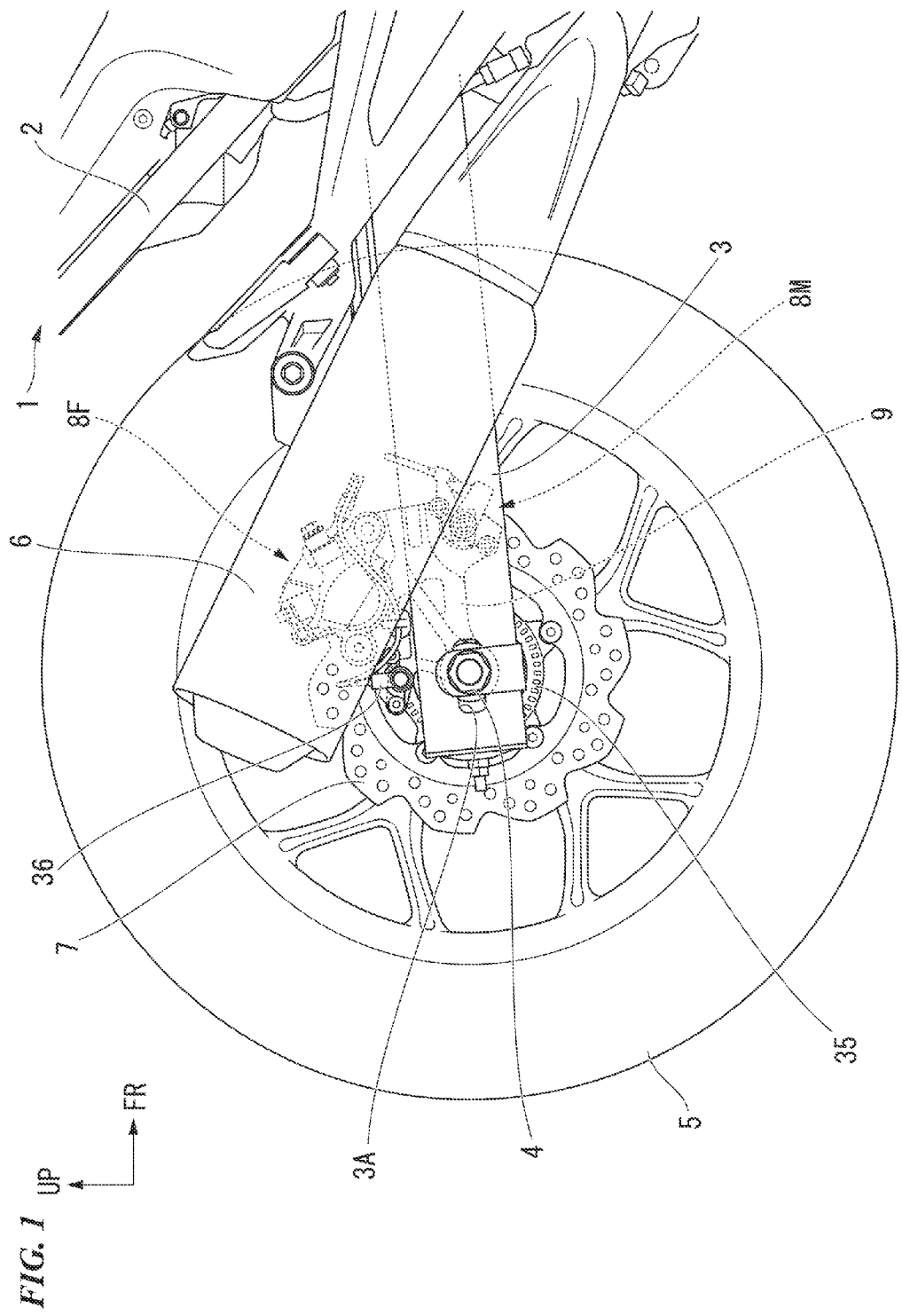
FIG. 1 is a right side view of a rear portion of a saddled vehicle to which a structure according to a first embodiment of the present invention is applied.

FIG. 1 shows a rear portion of a motorcycle 1 serving as an example of a straddle type vehicle to which a structure according to an embodiment of the present invention is applied. In this figure, reference symbol 2 denotes a vehicle frame, and on the vehicle frame 2 there is supported, in a manner that allows swinging (rotation) in the up-down direction, the front portion of a pair of left and right swing arms 3 that extend backward. A rear axle 4 serving as the axle, spans across at the rear portion of the left and right swing arms 3, and on the rear axle 4 there is rotatably supported a rear wheel 5. Moreover, on the right hand side of the swing arm 3 there is arranged a muffler 6.

In the rear portion of the left and right swing arms 3 are formed elongated holes 3A, and the rear axle 4 is inserted through the elongated holes 3A with clearance in the longitudinal direction of the elongated holes 3A. Making reference to FIG. 2, in the present embodiment, by turning adjustment nuts 3C, which are threadably engaged with adjusting screws 3B protruding from the rear wall portion of the left and right swing arms 3 and are in contact with the rear wall portion, the position of the rear axle 4 on the swing arm 3 in the extending direction (longitudinal direction) can be adjusted, so that the tension of a drive chain (omitted in the figure) can be adjusted.

Although the figure only shows the adjusting screws 3B and the like on the right side, these components are also provided on the left swing arm 3.

In the center of the rear wheel 5 there is provided a brake disc 7 which rotates integrally with the rear wheel 5. The brake disc 7 is sandwiched by a hydraulic brake caliper 8F or a mechanical brake caliper 8M, and it thereby gives a braking force to the rear wheel 5. Moreover on the radially inner side of the brake disc 7, a pulser ring 35 is provided which rotates integrally with the rear wheel 5. In the present embodiment, the pulser ring 35 is fixed to the inner circumferential edge of the brake disc 7.

Figure 2:
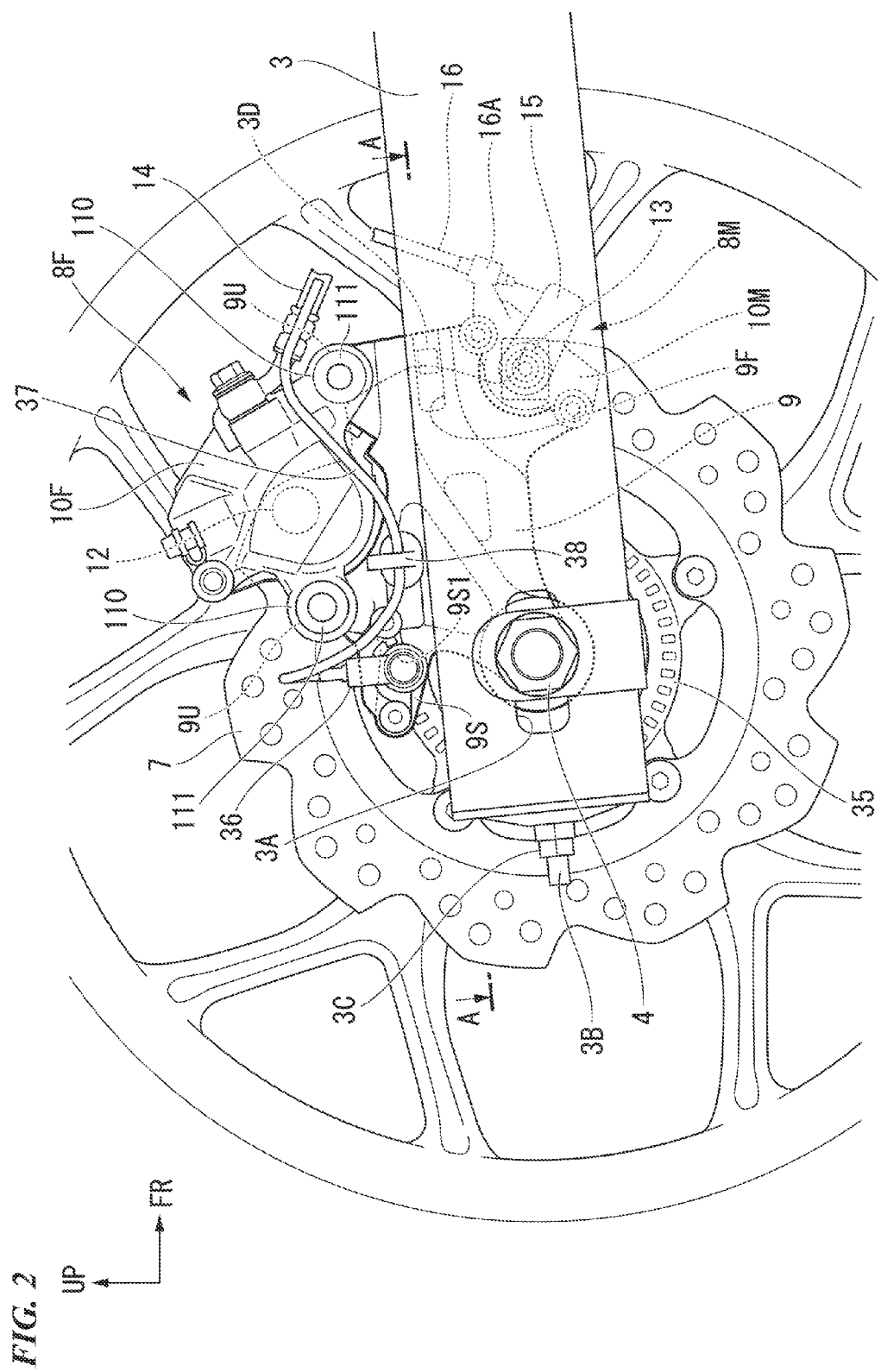
FIG. 2 is an enlarged view of FIG. 1.
Figure 3:
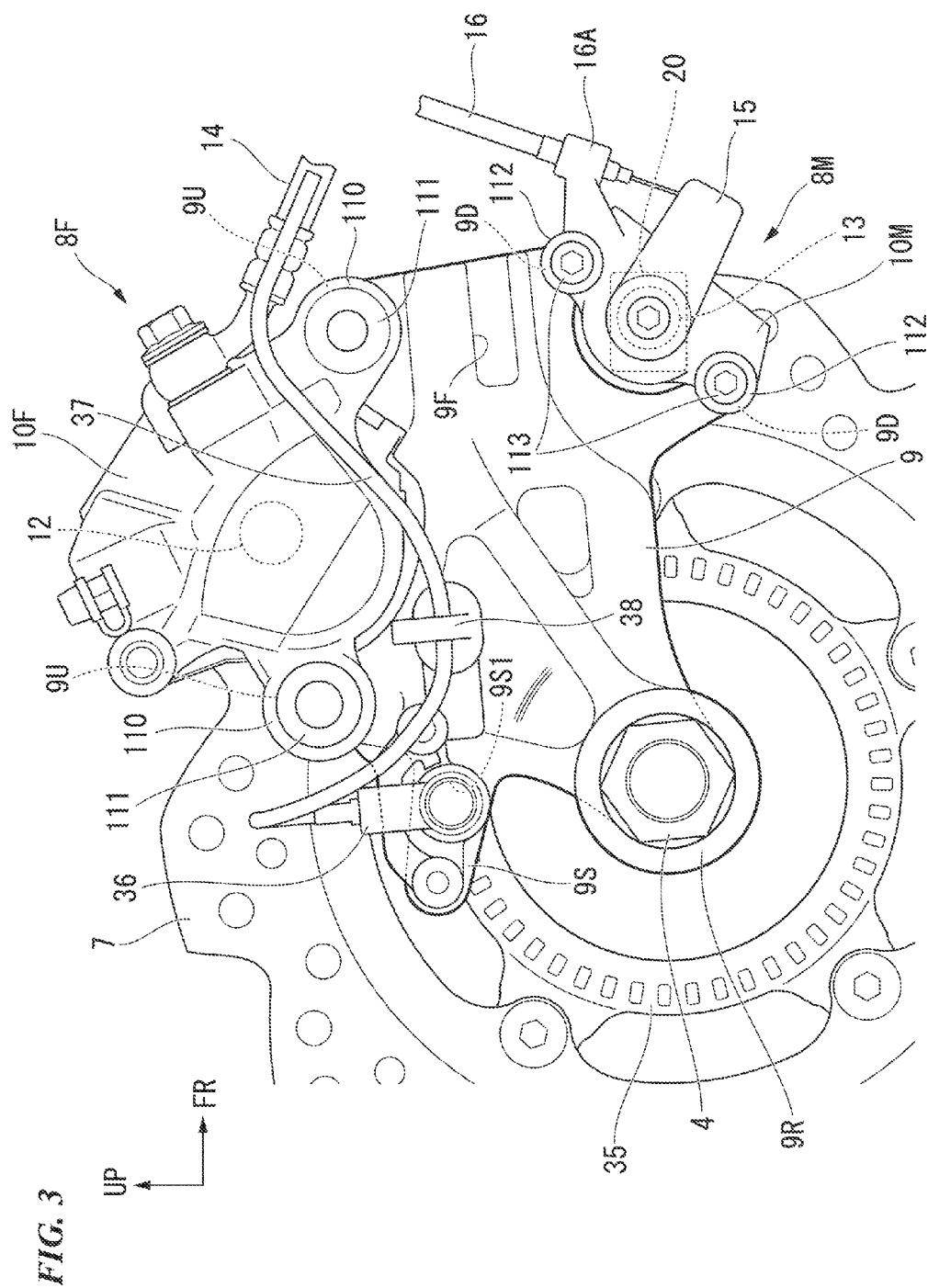
FIG. 3 is an enlarged view of FIG. 2 in a state with a swing arm removed.

Making reference to FIG. 2 and FIG. 3, to the vehicle widthwise inside of the rear portion of the right swing arm 3 there is fixed a caliper bracket 9 formed from a plate member in a closed cross section shape or a hollow member. The hydraulic brake caliper 8F and the mechanical brake caliper 8M are each supported by the swing arm 3 via the caliper bracket 9, and swing integrally with the swing arm 3.

In the present embodiment, the hydraulic brake caliper 8F is arranged forward of the rear axle 4 when viewed from the side, at a position above the upper surface of the rear portion of the swing arm 3 and overlapping the muffler 6, and is supported by the caliper bracket 9. On the other hand, the mechanical brake caliper 8M is arranged forward of the rear axle when viewed from the side, at a position on the vehicle widthwise inside of the rear portion of the swing arm 3 and overlapping the swing arm 3, and is supported by the caliper bracket 9. In other words, the mechanical brake caliper 8M is provided on the swing arm 3 in a state of being covered from the vehicle widthwise outside by the swing arm 3.

The hydraulic brake caliper 8F is provided with a caliper body 10F that is supported so as to be able to move along the vehicle widthwise direction with respect to the caliper bracket 9 only by a predetermined distance. Moreover the mechanical brake caliper 8M is provided with a caliper body 10M that is supported so as to be able to move along the vehicle widthwise direction with respect to the caliper bracket 9 only by a predetermined distance. The caliper body 10F houses, in a manner of allowing it to slide in the vehicle widthwise direction, a hydraulically operated piston 12 that presses the brake disc 7. Moreover the caliper body 10M houses, in a manner of allowing it to slide in the vehicle widthwise direction, a mechanically operated piston 13 that presses the brake disc 7. In the present embodiment, the axial direction of each of the pistons 12 and 13 is parallel with the vehicle widthwise direction.

To the caliper body 10F of the hydraulic brake caliper 8F there is connected a brake hose 14 for supplying pressurized fluid to a cylinder (not shown in the figure) which houses the hydraulically operated piston 12. The hydraulically operated piston 12 operates according to the fluid pressure caused by pressurized fluid supplied from the brake hose 14. To describe in detail, when pressurized fluid is supplied into the cylinder via the brake hose 14, the hydraulically operated piston 12 is propelled to the brake disc 7 side and presses the brake disc 7 via a brake pad (omitted in the figure).

In the present embodiment, the brake hose 14 is connected from the caliper body 10F to a master cylinder (not shown in the figure) which is provided at the center lower portion of the motorcycle 1. By means of an operation performed with a foot pedal swingably supported in the vicinity of the master cylinder, pressurized fluid within the master cylinder is supplied to the caliper body 10F through the brake hose 14. The hydraulic brake caliper 8F, in the present embodiment, is used for normal braking while traveling.

Figure 4:
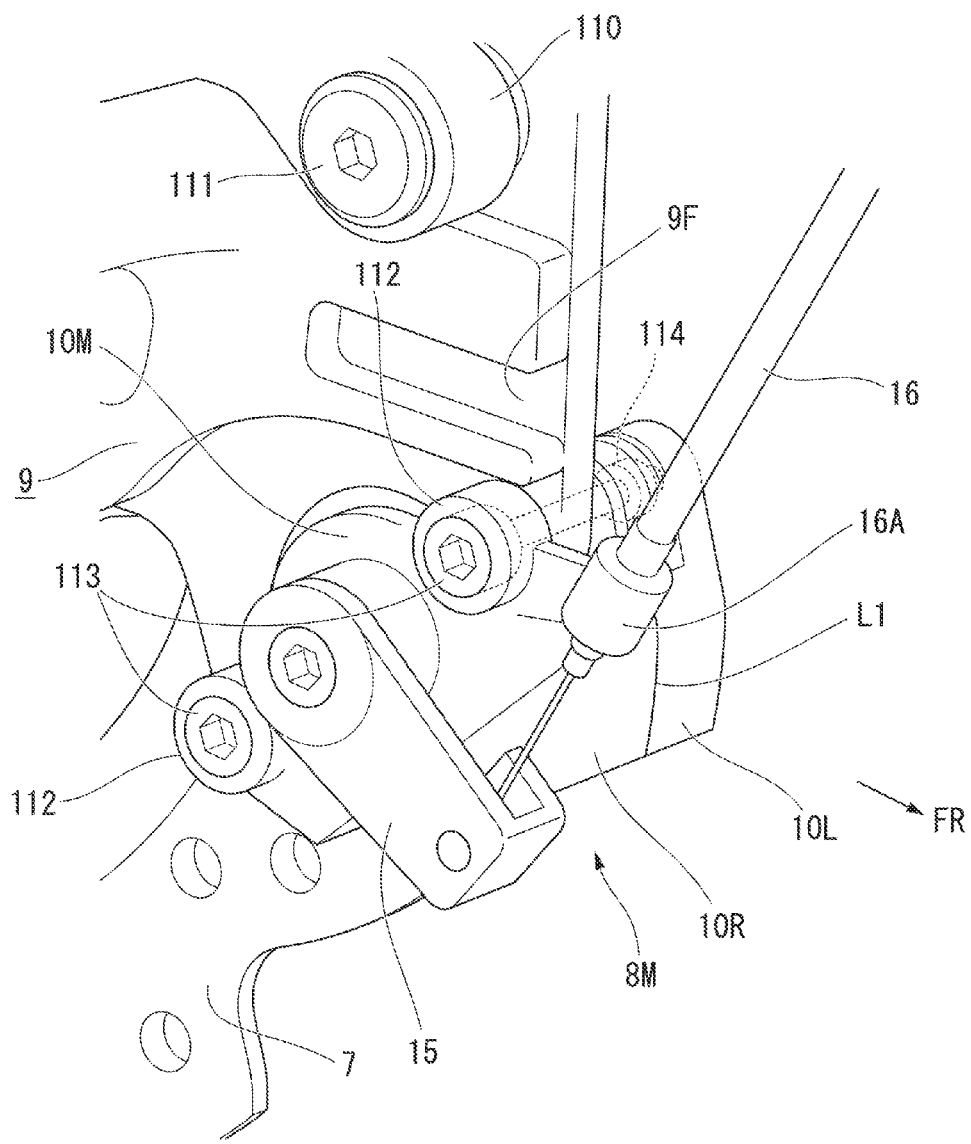
FIG. 4 is a perspective view of a mechanical brake caliper serving as a brake caliper for parking provided on a swing arm.

On the other hand, making reference to FIG. 3 and FIG. 4, on the vehicle widthwise outside wall portion of the caliper body 10M of the mechanical brake caliper 8M, there is rotatably supported a rotation arm 15 that extends forward and downward, and to the tip end portion of the rotation arm 15 there is connected a brake cable 16. The brake cable 16 has its one end connected to the rotation arm 15, and the other end thereof, after extending upward, is connected to a brake lever, which is an operating element (not shown in the figure) and which is provided at an appropriate location of the vehicle such as the steering bar. As a result of this brake lever being operated, the cable is pulled and rotates the rotation arm 15. On the caliper body 10M is formed a support arm 16A which extends forward and supports the brake cable 16.

Making reference to FIG. 4, the rotation arm 15 extends from the caliper body 10M and then bends back so as to fold towards the vehicle widthwise inside. The brake cable 16 is connected to this bent tip end portion. The mechanical brake caliper 8M is such that by pulling the brake cable 16 to rotate the rotation arm 15, the mechanically operated piston 13 is propelled to the brake disc 7 side, and presses the brake disc 7 via a brake pad 20 (refer to FIG. 6).

In the present embodiment, the brake lever is configured so that it is releasably retained at a position where the brake cable 16 has been pulled only by a predetermined amount, so that the state where the mechanically operated piston 13 is pressing the brake disc 7 can be maintained. As such the mechanical brake caliper 8M configures a parking brake mechanism which can maintain a parked state. Moreover, the brake lever is biased so that when the state of being retained at the position where the brake cable 16 has been pulled by means of the operation only by the predetermined amount is released, it returns to the state prior to this operation, and when the above state is released, the rotation arm 15 also returns to the pre-rotation state.

Figure 5:
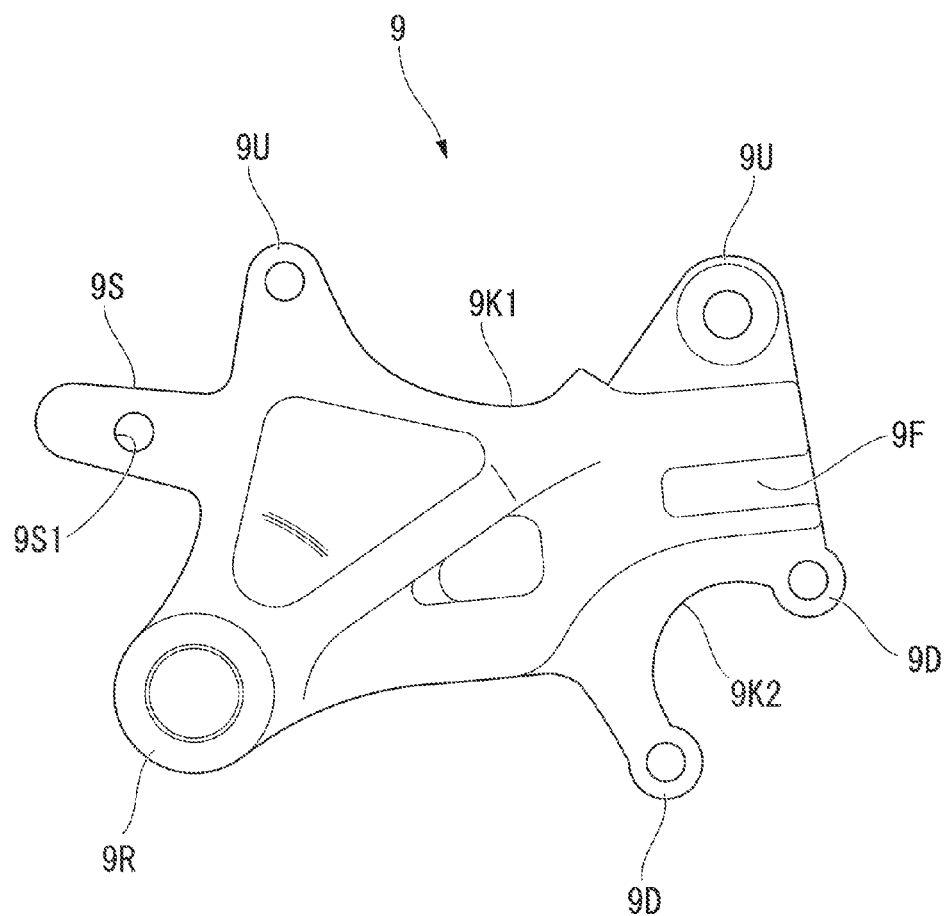
FIG. 5 is a right side view of a caliper bracket for supporting a mechanical brake caliper serving as a brake caliper for parking and a hydraulic brake caliper serving as a brake caliper for braking.
Figure 6:
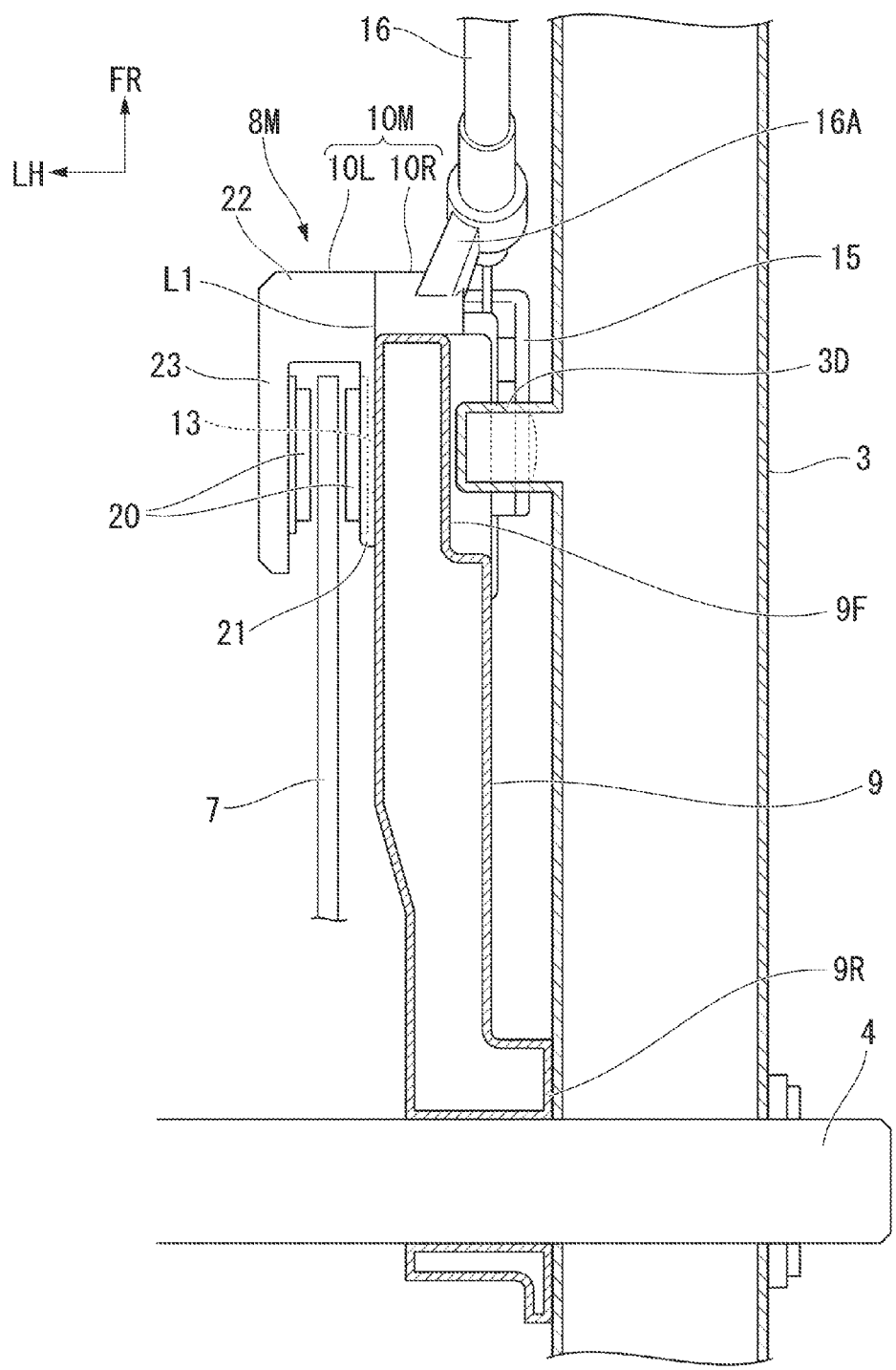
FIG. 6 is a cross sectional view taken along the line A-A in FIG. 2.

With reference to FIG. 2, FIG. 3, FIG. 5, and FIG. 6, the caliper bracket 9 is formed in a shape so as to extend along the direction of extension of the swing arm 3, and as shown in FIG. 6 is formed in a closed cross section shape (hollow shape), and is made of metal. The caliper bracket 9 comprises two support portions corresponding to the swing arm 3, that is, it comprises a boss portion 9R formed at the lower rear side into which is inserted the rear axle 4, and a recess portion 9F which is formed in the wall portion on the vehicle widthwise outside and is recessed towards the vehicle widthwise inside. The recess portion 9F is formed at substantially the center in the vertical direction of the wall portion in the front portion on the vehicle widthwise outside of the caliper bracket 9.

On the wall portion on the vehicle widthwise inside of the swing arm 3 is formed a protrusion portion 3D which protrudes toward the vehicle widthwise inside. The caliper bracket 9, by insertion of the rear axle 4 into the boss portion 9R and engagement of the protrusion portion 3D of the swing arm 3 with the recess portion 9F, is supported by the swing arm 3 in a state where swinging in the vertical direction about the rear axle 4 is restricted.

The recess portion 9F is formed so as to extend some distance in the longitudinal direction (direction of extension) of the swing arm 3, and the protrusion portion 3D engages with the recess portion 9F so as to allow relative movement in the direction of extension of the swing arm 3.

That is to say, when the position of the rear axle 4 is adjusted, the protrusion portion 3D moves relative to the swing arm 3 in the recess portion 9F, thereby restricting swinging of the caliper bracket without impeding the position adjustment of the rear axle 4.

Making reference to FIG. 2, the upper portion of the caliper bracket 9 projects upward from the swing arm 3 in a state of being supported by the swing arm 3. Moreover making reference to FIG. 5, at the upper portion of the caliper bracket 9 there is formed a pair of hydraulic caliper support boss portions 9U formed aligned in the front-back direction. Furthermore, at the lower front portion of the caliper bracket 9 covered by the swing arm 3, there is formed a pair of mechanical caliper support boss portions 9D formed aligned diagonally in a direction from the rear upward toward the front.

The hydraulic caliper support boss portions 9U are formed above the recess portion 9F, and the mechanical caliper support boss portions 9D are formed below the recess portion 9F. At the top of the caliper bracket 9, the region between the hydraulic caliper support boss portions 9U aligned in the front-back direction is recessed downward to form an arc-shaped cutaway portion 9K 1. Furthermore, on the bottom side of the front portion of the caliper bracket 9, the region between the mechanical caliper support boss portions 9D aligned diagonally in a direction from the rear upwards toward the front, is recessed upwards toward the rear to form an arc-shaped cutaway portion 9K2.

The hydraulic caliper support boss portions 9U and the mechanical caliper support boss portions 9D are each pierced through in the vehicle widthwise direction. The caliper body 10F of the hydraulic brake caliper 8F is supported so as to be able to move along the vehicle widthwise direction only by a predetermined distance, by passing bolts 111 which pass through two attachment portions 110 formed so as to project outward from sides of the location where the hydraulically operated piston 12 is accommodated, through the hydraulic caliper support boss portions 9U and retaining therein.

In a state with the hydraulic brake caliper 8F attached to the caliper bracket 9, the location where the hydraulically operated piston 12 of the caliper body 10F is accommodated, is positioned on the inside of the cutaway portion 9K1 when viewed from the side. Thus, in the present embodiment, projection of the hydraulic brake caliper 8F when attached to the caliper bracket 9 is suppressed.

Furthermore, the caliper body 10M of the mechanical brake caliper 8M is supported so as to be able to move along the vehicle widthwise direction only by a predetermined distance, by passing bolts 113 (fastening members) which pass through two attachment portions 112 formed so as to extend outward from sides of the location where the mechanically operated piston 13 is accommodated, through the mechanical caliper support boss portions 9D and retaining therein.

In a state with the mechanical brake caliper 8M attached to the caliper bracket 9, the location (formed on the right half portion 10R described later) where the mechanically operated piston 13 of the caliper body 10M is accommodated, is positioned on the inside of the cutaway portion 9K2 when viewed from the side. Thus, in the present embodiment, projection of the mechanical brake caliper 8M when attached to the caliper bracket 9 is suppressed. Furthermore, in a state with the hydraulic brake caliper 8F and the mechanical brake caliper 8M attached to the caliper bracket 9, the recess portion 9F formed in the caliper bracket 9 is positioned between the hydraulic brake caliper 8F and the mechanical brake caliper 8M in the vertical direction.

Furthermore, making reference to FIG. 4 and FIG. 6, in the present embodiment, the caliper body 10M of the mechanical brake caliper 8M has a left and right split construction formed by joining a right half portion 10R and a left half portion 10L, which can be split into left and right parts along a split line L1. In FIG. 4 is shown a bolt 113 which is inserted through the front mechanical caliper support boss portion 9D and supports the caliper body 10M. As shown in the same figure, the bolt 113 jointly fasten the upper portion of the right half portion 1 OR and the left half portion 10L, and supports the caliper bracket 9. In FIG. 4, reference symbol 114 denotes a nut that is threadably engaged on the tip end of the bolt 113, and while omitted in the figure, the nut 114 is embedded in a recess formed in the left half portion 10L.

Although detailed description is omitted herein, a bolt 113 inserted through the rear mechanical caliper support boss portion 9D also jointly fastens the right half portion 10R and the left half portion 10L and supports the caliper bracket 9.

Furthermore, in FIG. 6 is shown a pair of brake pads 20 arranged on the left and right of the brake disc 7. In the present embodiment, in the right half portion 10R there is housed the mechanically operated piston 13 in a manner of allowing it be propelled towards the brake disc 7 side. On the other hand, in the left half portion 10L there is integrally provided; an attachment base portion 21 through which the bolt 113 is inserted, a bridge portion 22 which extends so as to straddle from the attachment base portion 21 to the brake disc 7 in the axial direction, and an inner side contact portion 23 that extends from the bridge portion 22 toward the center of the brake disc 7, and that opposes the mechanically operated piston 13 across the brake disc 7.

Between the mechanically operated piston 13 and the inner side contact portion 23 there are arranged brake pads 20 on the left and right sides of the brake disc 7. These brake pads 20 are supported at appropriate positions of the caliper body 10M, and are able to move along the axial direction of the mechanically operated piston 13.

When the mechanical brake caliper 8M gives a braking force to the brake disc 7, the rotation arm 15 is rotated and the mechanically operated piston 13 is propelled toward the brake disc 7 side, so that the mechanically operated piston 13 contacts the brake disc 7 via the brake pad 20. Whereupon, the mechanical brake caliper 8M moves to the vehicle widthwise outside, and the inner side contact portion 23 of the left half portion 10L contacts the brake disc 7 via the brake pad 20. As a result, the brake disc 7 is sandwiched by the left and right brake pads 20, thereby imparting a braking force.

On the other hand, making reference to FIG. 5, at the rear portion of the caliper bracket 9 there is formed a wheel speed sensor attachment portion 9S which extends towards the rear. At the center in the extending direction of the wheel speed sensor attachment portion 9S, there is formed a wheel speed sensor attachment hole 9S1. Making reference to FIG. 1 to FIG. 3, in the wheel speed sensor attachment hole 9S1, a wheel speed sensor 36 is attached by a fastening member. This wheel speed sensor 36, when viewed from the side, is arranged behind the hydraulic brake caliper 8F, behind and above the swing arm 3, and below the muffler 6. More specifically, the wheel speed sensor 36 is arranged rearward of the hydraulic brake caliper 8F and the mechanical brake caliper 8M, below the hydraulic brake caliper 8F, and above the mechanical brake caliper 8M. By arranging the wheel speed sensor 36 in such a way, the area surrounding the wheel speed sensor is covered by a plurality of members. Therefore the wheel speed sensor 36 can be protected from dust and the like.

Furthermore, a wheel speed sensor harness 37 connected to the wheel speed sensor 36 is routed so as to extend forward from the wheel speed sensor 36. Specifically, the wheel speed sensor harness 37, after extending upward from the wheel speed sensor 36, extends forward in a downward protruding state, and then on the front portion side of the hydraulic brake caliper 8F, extends forward so as to overlap the brake hose 14 connected to the hydraulic brake caliper 8F. More specifically, the wheel speed sensor harness 37 is routed such that at least the location from the wheel speed sensor 36 to the brake hose 14 passes above the swing arm 3 between the hydraulic brake caliper 8F and the mechanical brake caliper 8M. At the center of the caliper bracket 9 in the front-back direction there is provided a hook portion 38 through which the wheel speed sensor harness 37 is passed such that vertical movement thereof is suppressed.

As described above, in the motorcycle 1, a mechanical brake caliper 8M which is a parking brake caliper that can maintain a parked state, is arranged in front of the axle (rear axle 4) of the rear wheel 5 when viewed from the side, at a position on the vehicle widthwise inside of the swing arm (3) and overlapping the swing arm 3. In this manner, by arranging the mechanical brake caliper 8M so as to utilize the space on the vehicle widthwise inside of the swing arm 3 without affecting the bank angle, projection to the vehicle widthwise outside resulting from the placement of the mechanical brake caliper 8M can be suppressed. Thereby, the bank angle of the motorcycle 1 can be ensured easily even when two brake calipers are provided. Moreover the outward appearance can also be improved.

Furthermore, in the motorcycle 1, because the hydraulic brake caliper 8F serving as the brake caliper for braking is positioned above the swing arm 3, the height from the ground of the hydraulic brake caliper 8F can be ensured, as can the bank angle.

Moreover, in the motorcycle 1, the brake cable 16 connected to the mechanical brake caliper 8M is configured to extend upward. Therefore, the brake cable 16 can be more easily routed than in a case where the brake cable 16 extends downward, and the degree of freedom in the arrangement of the mechanical brake caliper 8M can be improved. The brake cable 16 may be extended downward, however considering the potential for slackening of the brake cable 16, the height from the ground of the brake caliper for parking (the mechanical brake caliper 8M in the present embodiment) must be ensured. Therefore, the placement of the brake caliper for parking is relatively restricted.

Furthermore, in the motorcycle 1, by providing a single caliper bracket 9 on the swing arm 3, and attaching the mechanical brake caliper 8M and the hydraulic brake caliper 8F to the caliper bracket 9, the number of components can be reduced. Moreover, the mechanical brake caliper 8M has a left and right split construction composed of the left half portion 10L and the right half portion 10R, and the left half portion 10L and the right half portion 10R are jointly fastened to the caliper bracket 9 by the bolt 113 and support the caliper bracket 9. Therefore the number of components can be reduced.

In addition, in the motorcycle 1, the caliper bracket 9 comprises two support portions for the swing arm 3. One of the support portions is configured as a boss portion 9R which supports and has the rear axle 4 inserted therethrough, and the other is configured as a recess portion 9F which engages with the protrusion portion 3D formed on the swing arm 3 so as to allow movement in the direction of extension of the swing arm 3. The recess portion 9F is positioned between the mechanical brake caliper 8M and the hydraulic brake caliper 8F. Therefore, the caliper bracket 9 can be attached to the swing arm 3 in a way that restricts swinging with respect to the swing arm 3, using a simple construction that effectively utilizes the space between the two brake calipers. Hence the size of the caliper bracket 9 can be reduced.

The embodiments of the present invention have been described. However, the present invention is not limited to the embodiments, and various modifications may be made without departing from the scope of the invention.

For example, in the embodiment described above, the mechanical brake caliper 8M is arranged at a position on the vehicle widthwise inside of the swing arm 3 and overlapping the swing arm 3. However, the hydraulic brake caliper 8F may be arranged at a position on the vehicle widthwise inside of the swing arm 3 and overlapping the swing arm 3, with the mechanical brake caliper 8M arranged above the swing arm 3.

Furthermore, depending on the shape of the swing arm 3 (for example when a relatively large width is ensured in the vertical direction), the mechanical brake caliper 8M and the hydraulic brake caliper 8F may both be arranged at a position on the vehicle widthwise inside of the swing arm 3 and overlapping the swing arm 3.

Moreover, in the present embodiment, the mechanical brake caliper 8M serves as the brake caliper for parking and the hydraulic brake caliper 8F serves as the brake caliper for braking. However, a hydraulic brake caliper may be used for parking, and a mechanical brake caliper may be used for braking.

DESCRIPTION OF REFERENCE SYMBOLS

1 Motorcycle (saddled vehicle)
3 Swing arm

3D Protrusion portion
4 Rear axle (axle)
5 Rear wheel
7 Brake disc
8F Hydraulic brake caliper (brake caliper for braking)
8M Mechanical brake caliper (brake caliper for parking)
9 Caliper bracket (bracket)
9R Boss portion
9F Recess portion
10M Caliper body
10L Left half portion
10R Right half portion
16 Brake cable

The invention claimed is:

1. A brake caliper arrangement structure for a motorcycle comprising:
a swing arm that rotatably supports a rear wheel;
a brake caliper for braking; and
a brake caliper for parking which can maintain a parked state;
wherein the brake caliper for braking and the brake caliper for parking are provided on the swing arm,
and the brake caliper for braking and the brake caliper for parking are both arranged in front of an axle of the rear wheel when viewed from a side,
and the brake caliper for parking is arranged at a position on a vehicle widthwise inside of the swing arm and overlapping the swing arm, and the brake caliper for braking is arranged above the swing arm.

2. The brake caliper arrangement structure for a motorcycle according to claim 1, wherein the brake caliper for braking is arranged at a position overlapping a muffler when viewed from the side.

3. The brake caliper arrangement structure for a motorcycle according to claim 1, wherein the brake caliper for parking is arranged in front of the axle of the rear wheel when viewed from the side, at a position on the vehicle widthwise inside of the swing arm where a caliper recess portion is not provided and overlapping the swing arm, and a brake cable connected to the brake caliper for parking extends upward.

4. The brake caliper arrangement structure for a motorcycle according to claim 1, wherein a single bracket is provided on the swing arm, and the brake caliper for braking and the brake caliper for parking are attached to the bracket.

5. The brake caliper arrangement structure for a motorcycle according to claim 4, wherein at a rear portion of the bracket there is formed a wheel speed sensor attachment portion which extends towards the rear,
and a wheel speed sensor is arranged behind the brake caliper for braking and the brake caliper for parking when viewed from the side,
and below the brake caliper for braking and above the brake caliper for parking.

6. The brake caliper arrangement structure for a motorcycle according to claim 5, wherein a wheel speed sensor harness connected to the wheel speed sensor is extended forward so as to overlap a brake hose connected to the brake caliper for braking, and is routed towards a brake cable connected to the brake caliper.

7. The brake caliper arrangement structure for a motorcycle according to claim 4, wherein the brake caliper for parking has a left and right split construction composed of a left half portion and a right half portion, wherein the left half portion and the right half portion are jointly fastened to the bracket by a fastening member so as to support the bracket.

8. The brake caliper arrangement structure for a motorcycle according to claim 4, wherein the bracket comprises two support portions corresponding to the swing arm,
one of the support portions being configured as a boss portion which supports and has the axle inserted therethrough, and the other being configured as a recess portion which engages with a protrusion portion formed on the swing arm so as to allow relative movement in a direction of extension of the swing arm,
wherein the recess portion is positioned between the brake caliper for braking and the brake caliper for parking.

* * * * *